Jan. 31, 1961     H. EDMONDS     2,969,596
GAGE SETTING AND CHECKING APPARATUS
Filed Feb. 15, 1960     3 Sheets-Sheet 1
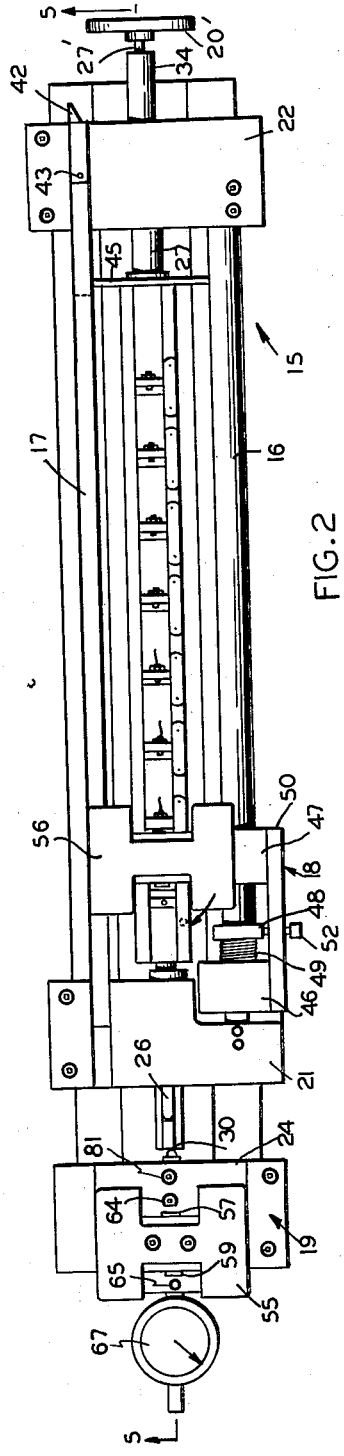
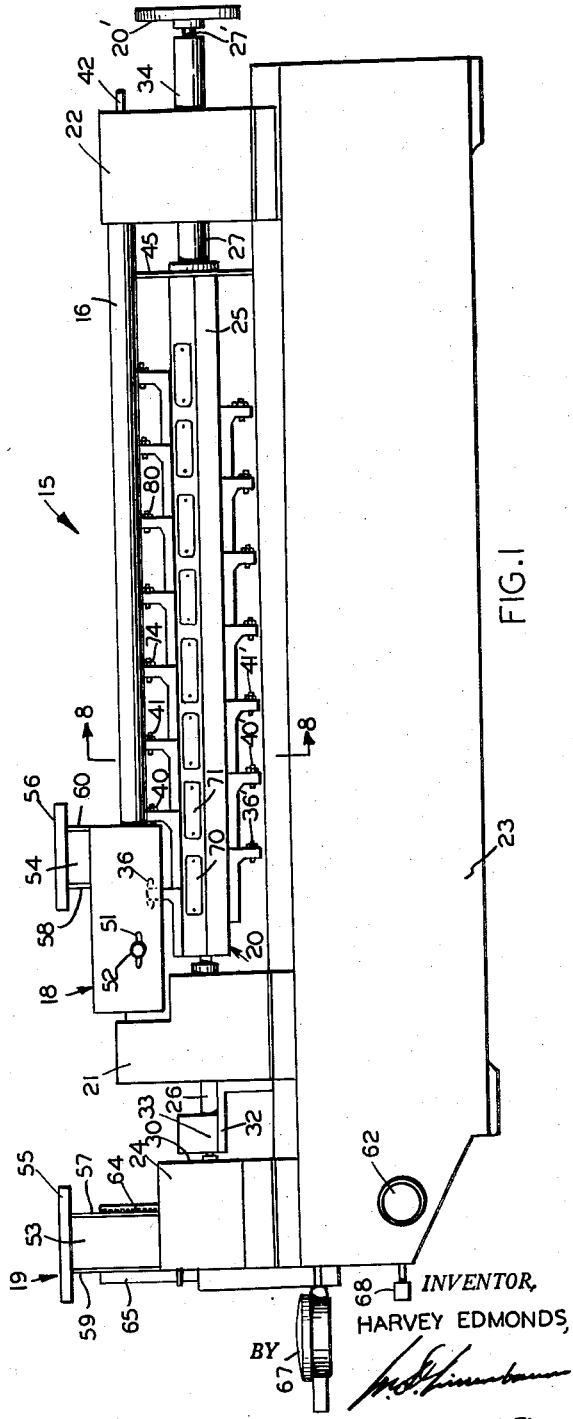
INVENTOR,
HARVEY EDMONDS,
BY
ATTORNEY.

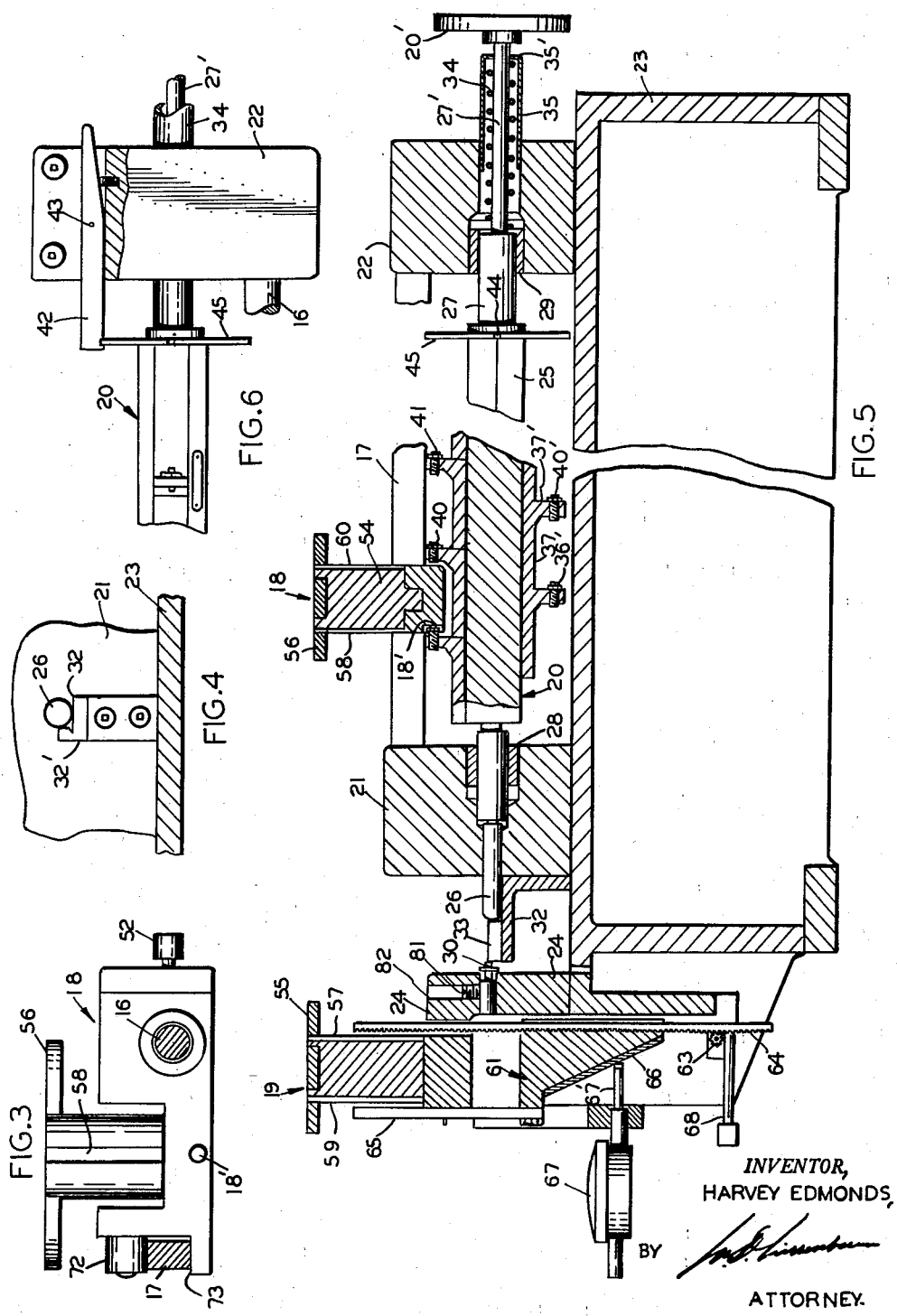

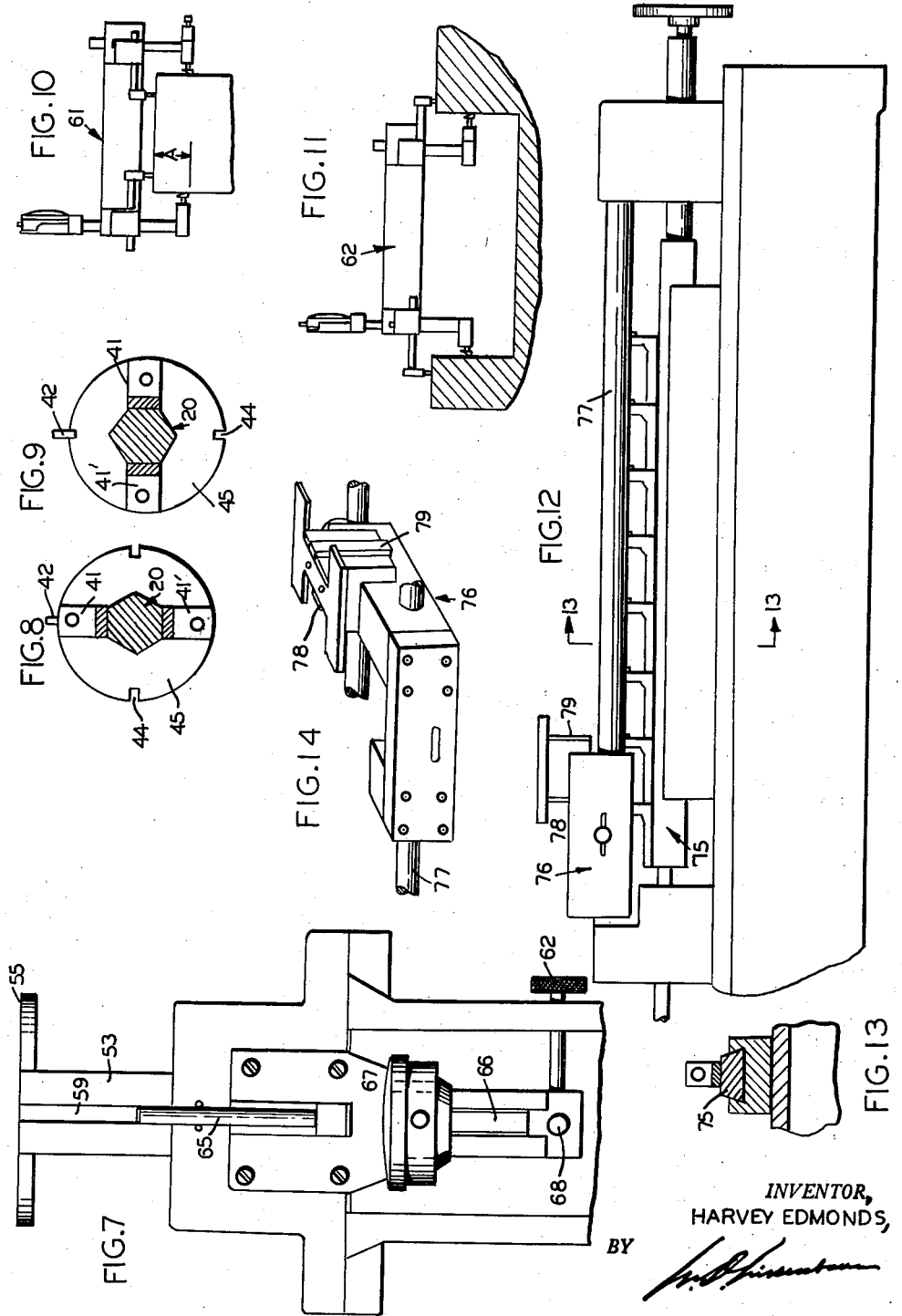

United States Patent Office 2,969,596
Patented Jan. 31, 1961

2,969,596

GAGE SETTING AND CHECKING APPARATUS

Harvey Edmonds, Poughkeepsie, N.Y., assignor to Boice Manufacturing Company, Inc., Hyde Park, N.Y., a corporation of New York Filed Feb. 15, 1960, Ser. No. 8,835

20 Claims. (Cl. 33—143)

The present invention relates to precision measuring devices and more particularly to linear dimension gage apparatus especially when of large size.

An object of this invention is to provide novel and improved adjustable apparatus for setting and checking gages of the type mentioned of various sizes, which are used for the measurement of either inside or outside dimensions.

For one practice of this invention, I provide an apparatus which includes an anvil movable along a straight track, towards and away from a fixed anvil, an elongated unitary structure along said track, having precisely inch apart fixed stations therealong at any of which the movable anvil is to be positioned, a means to precisely set said unitary structure so that the distance from the first station thereon to the fixed anvil is a required amount depending on the gage to be worked with and a means to hold the movable anvil in its precisely required position at any chosen station.

A further object of this invention is to provide a novel and improved gage checking and setting apparatus of the character described, affording easy and precise setting of the station-carrying unitary structure in relation to the fixed anvil and for easy and precise setting of the movable anvil at any desired one of the stations.

In the practice of this invention, a spring means is employed to reliably maintain the station-carrying unitary structure in proper position and another spring means is used to reliably maintain the movable anvil in proper position at a chosen station. Since the maximum scope of longitudinal movement required of the station-carrying structure is comparatively small, the action of its associated spring presents no construction problem. However, is must be noted that the scope of travel of the movable anvil being of substantial length, its associated spring means calls for special constructional and operational relationships.

It is therefore another object of this invention, that for the movable anvil, its spring action shall be set into play at any station it may be positioned at, with substantially the same pressure.

To attain this purpose, one embodiment is to have a spring to urge the movable anvil along the track and against a contact point on the chosen station; said spring being between said anvil and a collar riding on the track and releasably secured thereto, as will be explained in further detail herein.

Since the movable anvil need be positioned between stations, either the stations need by shiftable to clear the path for movement of such anvil along the track or such movable anvil must be shiftable away from the lane of the stations to permit its movement along its track.

It is therefore another object of this invention to provide construction which will permit movement of the movable anvil from station to station.

To attain this, for example, the station-carrying unitary structure may be made movable to allow a clear path for the movable anvil along its track and to have proper indexing means to assure its proper resetting to use position, or the movable anvil may be made to swing on its track rod to clear the station structure it need bypass to effect its desired position.

Since with many gages of the type mentioned, either inside or outside measurement is to be made at a certain depth from a resting surface on the work, it is another object of this invention to provide the apparatus concerned with herein, with suitable adjustable gage means at the fixed anvil preferably, to serve to set and check for depth. For this purpose, each anvil may be provided with a resting platform to support the gage worked on, and some indicating gage means provided to show the distance from the plane of said resting platforms to the plane when the anvils of the tested gage contact the anvils of the tesing apparatus herein taught.

Still a further object of this invention is to provide a novel and improved gage setting and checking apparatus having the attributes mentioned, which is of simple construction, reasonable in cost, easy to manipulate, so constructed that all parts thereof that may wear are easily and cheaply replaced and which whole apparatus is efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is the front view of a gage setting and checking apparatus embodying the teachings of this invention.

Fig. 2 is a top plan view of Fig. 1.

Fig. 3 is an end view of the movable anvil as seen from the left in Fig. 1.

Fig. 4 is an end view of a support and aligning platform for gage blocks. This platform is part of the apparatus of Fig. 1 and this end view is taken as in Fig. 3.

Fig. 5 is an enlarged fragmentary section taken at line 5—5 in Fig. 2.

Fig. 6 is a top plan view of the right hand portion of Fig. 5, shown partly in section to expose an indexing device used in conjunction with the station-carrying unitary structure.

Fig. 7 is an enlarged end view of Fig. 1, shown fragmentarily.

Fig. 8 is a section taken at line 8—8 in Fig. 1, showing the position of the station-carrying unit as in use.

Fig. 9 is a similar view showing said unit moved to clear the path for the movable anvil along its track.

Fig. 10 shows a gage as applied to measure an outside dimension of a piece of work, a distance down from the top surface of such work piece.

Fig. 11 is a similar view where the measure is taken of an inside dimension.

Fig. 12 is a fragmentary front view of a modified embodiment of the apparatus taught herein. Whereas in Fig. 1, the station-carrying unit is swung from its use position to clear the path for the movable anvil to travel along its track, here in Fig. 12, it is the movable anvil which is swung from its normal use position to by-pass the stations so that it can travel along its track.

Fig. 13 is a section taken at line 13—13 in Fig. 12.

Fig. 14 is a perspective view of the movable anvil which is included in the embodiment shown in Fig. 12.

A detailed description will now be given of the apparatus shown, together with an explanation of their modes of operation with examples of their uses.

In the drawings, a preferred embodiment of this invention is the gage setting and checking apparatus indicated generally by the numeral 15, wherein on an elongated straight track offered by the rods 16, 17, a movable anvil denoted generally by the numeral 18, is slidably mounted for movement towards and away from a fixed anvil structure designated generally by the numeral 19. Along the track, there is a station-carrying member denoted generally by the numeral 20, which in this embodiment is slidably and rotatably mounted inwardly of its ends, in and through the blocks 21, 22, which are parts fixed atop a suitable base frame 23, as also is the block 24 which carries the fixed anvil. Said three blocks are in spaced relation and the track rods 16, 17 span the blocks 21, 22.

The body of said station-carrying member 20 is an elongated hexagonal bar 25 between the blocks 21 and 22, with reduced extensions 26, 27 coaxial therewith at its respective ends. These extensions are supported respectively in the bearings 28 and 29 which are set in the bearing blocks 21, 22 respectively, and said extensions extend outwardly of said blocks respectively. The extension 26 which is directed towards the fixed anvil 19, serves as a contact plunger cooperating with the fixed reference contact 30, to hold between them one or a group of gage blocks 33 which are rested on a fixed table 32 having an upright wall 32' for aligning such gage blocks. The end portion of the extension 27 is further reduced as at 27', to offer a stop shoulder for one end of a compression spring about part 27'. This spring 34 is within a fixed tubular housing 35 which extends outwardly from the block 22 in the direction away from the fixed anvil. The free end of such housing has an inward flange 35' to act as a stop for the other end of the coil spring 34. The extension part 27' of the station-carrying member 20, extends outwardly from said housing 35, where it has a terminal knob 20' for manual hold to slide and rotate the station-carrying member 20, in the bearings 28, 29.

Along the hexagonal bar 25, spaced in a row on a flat surface thereof, are stations, each presenting a contact like 36, for a contact button 18' on the movable anvil 18 to bear against. Another row of similar stations are provided on the opposite flat surface of the bar 25. Each station structure may be afforded by an angle piece 37 secured to said bar to present a radial finger 37' through which there is the screw 38; the tip of these screws, all pointing in the same direction which is preferably in the direction pointed by the master reference contact point 30, are the station contacts indicated by the numerals 36, 40, 41 and 36', 40', 41' for example. All station contact points in a row, are in alignment, and the contact points in each row are equi-spaced and those in one row are in staggered relation with those of the other row. To shift the rows for operating relation with the contact button 18', any suitable indexing device may be provided as for instance the spring-biased pawl 42 swingably mounted at 43 on the block 22, for selective engagement in properly positioned notches 44 in a disc 45 fixed on and coaxially with the member 20. It is evident that the said station-carrying member is free for longitudinal sliding movement at all times and that it may be turned by releasing the pawl 42 from its engagement with the indexing disc 45, so that the station fingers are moved from vertical position shown in Figs. 1 and 8, to horizontal position shown in Fig. 9, to give a clear path to the movable anvil 18 along its track rods 16, 17 so that said anvil may be set at any station along the member 20.

The movably mounted anvil 18, which might be called the adjustable anvil, is a substantially U-shaped structure, through the arms of which, the track rod 16 passes. Between these arms 46, 47, the track rod 16 carries the collar 48 with a compression coil spring 49 intermediate said collar and the arm 46. The base piece of said U-form, which is the plate 50 connecting the members 46, 47, has a slot along said rod 16, indicated as 51, through which extends a set screw 52 slidable laterally along said slot and in a threaded hole through said collar 48 to releasably engage said track rod 16.

The fixed anvil structure carries a post 53 and the movable anvil on its arm 47, carries a post 54. An H-shaped gage rest plate is fixed atop each of these posts with their parallel arms along the track rods 16, 17. These rest plates are indicated by the numerals 55 and 56 respectively. A contact strip 57 on the post 53 faces a contact strip 58 on the post 54. The remote faces of said posts carry similar contact strips which are indicated at 59 and 60. All these contact strips are parallel to each other and perpendicular to the axis line of the member 20 which carries the stations for the movable anvil. Also, each of these strips 57–60 are of substantial length along the posts they are on, ending preferably in the plane of the gage-rest plates 55, 56.

It will be shown that the construction thus far specifically described, is employable to set and check a gage like 61 which measures an outside linear dimension and one like 62 which measures an inside linear dimension, when the contact parts of such construction are made in proper spaced relation. To set and check depth at which the gage dimension is considered, means of the nature shown in Figs. 1, 5 and 7, may be included.

A slide denoted generally by the numeral 61 is suitably mounted for up and down movement on the frame block 24 which is part of the fixed anvil structure. This slide is moved by turning the knob 62 to work the gearing 63 arranged to shift a vertical rack rod 64 which is fixed to said slide. This slide 61 also carries a vertical rod in front of the contact strip 59. At the upward position of said slide, the top ends of said rods 64, 65, which ends are coplanar, are in the plane of the gage-rest platform or plate 55. Said slide also carries a tilted plate 66 at the bottom thereof for translating the vertical movement of said slide to a horizontal motion to operate a dial indicator gage 67 which is set horizontal, to attain a ratio advantage as to the extent of movement of the slide 61 in relation to the extent of movement of the plunger 67' of said gage 67. The numeral 68 indicates a set screw to fix the rod 64 and hence the slide 61.

As a matter of example, let the apparatus above described have the following dimensions. The distance between the remote faces of the contact strips 59 and 57, shall be 1.5 inches; the distance between the remote faces of the contact strips 58 and 60 shall be 1.5 inches; the distance between successive station contact points in the row containing 36, 40, 41 to be 2.0 inches, likewise in the other row containing the station contact points 36', 40', 41'. Make the station contact points in said row containing 36, 40, 41 to be in staggered relation with the station contacts of the other row and 1.0 inch apart along the bar 20. When a gage block 33 measuring 1.0 inch is engaged between the fixed reference contact 30 in the fixed anvil structure and the plunger 26 of the station-carrying member 20, at the time that the contact button 18' on the movable anvil structure is in contact with the first station contact point 36, the distance between the faces of the remote strips 59 and 60 shall be 12.0 inches. The minimum distance between the reference point 30 and the plunger 26 shall be little more than 2.0 inches.

When so dimensioned, the apparatus shown in Figs. 1–9 is suitable for setting and checking gages as of Fig. 10, measuring a minimum outside dimension of 12.0 inches, and for gages as of Fig. 11, measuring a minimum inside dimension of 9.0 inches. Maximum dimensions will depend upon the number of stations along the member 20. Outside dimensions are those between the contact strips 57 and 58. Inside dimensions are those between the contact strips 59 and 60. Depth at which an outside dimension is taken, is measured by the indicating gage 67 as the distance from the resting face 55 and the top end of the rack rod 64. Depth at which an inside dimension is taken, is measured by the gage 67 as the distance from said resting surface 55 to the top end of the rod 65. At each of the stations, it is advisable to have markings indicating the full number of inches thereat when the movable anvil is at their position respectively, id est, there may be suitable, marked plates, one at each station, as 70, showing outside and inside dimensions. In the apparatus dimensioned as specifically described herein as an example, the markings on the plate 70 for the first station contact 36, would be "12 outside" and "9 inside." Those on the plate for the station contact 36', would be "13 outside" and "10 inside." Those on the plate 71 for the station contact 40 would be "14 outside" and "11 inside" etc., and preferably abbreviated to for instance "12 O.D." and "9 I.D."

I will now show an illustrative use of this apparatus to either set or check a gage of Fig. 10, which say is for measuring an outside dimension 16.375 inches to be taken at a depth of 1.200 inches, and I will presume that the technician receives the apparatus in its condition shown in Fig. 1 where the gage block 33 measures 1.000 inch. He will then do as follows. Loosen the set screw 52 to release the movable anvil 18 from hold on its track rod 16. Shift the pawl 42 thereby releasing the index plate 45 and turn the station-carrying member 20 from its position shown in Fig. 8, to the position shown in Fig. 9, whereby the movable anvil 18 is free to be slid along its track rods 16, 17. I may here note the rotatable roller 72 which rides along the rod 17 and which in conjunction with the ledge 73 on the movable anvil, holds said anvil on such track rod. Now place on the table 32, in abutment with the 1.000 gage block 33, a gage block (not shown) measuring 0.375 inch, while pulling the hand knob 20' to make space therefor. Now release hold of the knob, whereupon action of the stressed spring 34 will shift the station-carrying member 20 so that plunger 26 and master contact point 30 on the fixed anvil 19, a clamp the gage blocks now on the table 32, totalling 1.375 inches. Now slide the movable anvil 18 so that its post 54 is in the region between the station contact points 41 and 74. Turn the knob 20' so that member 20 is shifted back to the position shown in Figs. 1 and 8, pressing the pawl 42 to release member 20 for rotary movement. Now reset the pawl in the notch 44 which it meets in the plate 45. The post 54 of the movable anvil 18 is now directly between the station contact points 41 and 74. I may mention here that the contact button 18' on the movable anvil presents its surface in the plane of the exposed surface of the contact strip 58 on such anvil 18.

Now, take hold of the head of the set screw 52 and move the collar 48 towards the fixed anvil 19. This will move the anvil 18 until it comes to rest when its contact button 18' contacts the station contact point 74, and upon further shift of said collar, the compression coil spring 49 will become stressed, thereby precisely positioning the movable anvil which is then maintained by tightening said set screw 52 to hold said collar 48 fast to the track rod 16. The movable anvil 18 is thus spring pressed against the station point 74. In order to attain uniform pressure at every station, the length of the slot 51 may be made such that when the shank of the set screw 52 is at the left end of such slot in Fig. 1, the biasing of the movable anvil is a desired extent. Now loosen set screw 68 and turn the knob 62 to lower the slide 61, so that the coplanar top ends of the rods 64, 65 are at a distance below the resting surface of the platform 55, in excess of the depth distance indicated by "a" in Fig. 10, which is to be checked.

Now set the gage 61 to be checked (or set) so that its rests 75 and 76 rest on the platforms 55 and 56 respectively, with its gage anvils 77 and 78 facing the contact strips 59 and 60 respectively. For the gage 61 to be precise, its anvil 77 should contact the contact strip 59 on the fixed anvil 19, and the anvil 78 should contact the contact strip 60 on the movable anvil 18. The slide 61 may have been initially set so that its position indicates distance "A," or knob 62 may be worked after the gage 61 is mounted on the apparatus 15.

I may note that when apparatus 15 is set for an O.D. of 1.375 inches as aforesaid, it is likewise set for an I.D. of 13.375 inches. It is evident that this apparatus in the embodiment specifically dimensioned, needs gage blocks a one inch gage block 33 and others for any required fractional parts of an inch.

It is evident that in the event the distance between the remote faces of the contact strips 58 and 60 is 1.0 inch and likewise as to the contact strips 57 and 59, that the stations can be only in one row and be 1.0 inch apart, and the station-carrying member need only be slidably mounted. To permit travel of the movable anvil in such case, it is practical to have it swingable so that it may be set at any station along such slidably mounted station-carrying member. Such a modified embodiment is shown herein in Figs. 12–14, where the station-carrying member 75 is a slide having reduced end sections and associated with spring biasing means as set forth in the embodiment 15. Since there is no need for rotary movement of said member 75, a suggested way to afford positioning of the movable anvil 76, is to make it minus the ledge 73 used in 18. Now, this adjustable anvil can be swung out of the line of the stations and slid along its round track rod 77 and then swung into position to cooperate with any of the stations. Of course, the distance between the outer faces of the contact strips 79 and 78 is made 1.0 inch and likewise on the fixed anvil not shown.

Without further illustration, it is evident to those versed in the art, that apparatus herein taught may be adapted to conditions where the stations are in specially spaced relation other than equi-spaced and that the measurement system may be other than in inches. Each station contact point in the embodiments shown, may have lock-nut provision as at 80 and the master reference contact point 30 may also be provided with a locking set screw 81, which may be sealed by a compound introduced into the counter-bore 82. The choice of materials for the various parts of the apparatus, their hardening, grinding, lapping and radiusing and other incidents of their structure are made in accordance with established practices well known to those versed in this art, to attain precision.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description herein to indicate the scope of this invention.

I claim:

1. In an apparatus for setting and checking linear dimension gages, a frame, an anvil structure fixed on the frame, another anvil structure mounted on an elongated straight track on the frame, for sliding movement along said track, towards and away from said fixed anvil structure, an elongated station-carrying member positioned along said track, mounted on the frame for sliding longitudinal movement, a plurality of spaced station elements extending laterally from said station-carrying member, station contact points, one on each of said station elements and pointing along the line of said track, a contact point on the movable anvil structure, adapted to contact each of said station contact points, one at a time; said movable anvil structure and said station-carrying member being relatively movable whereby said movable anvil structure can be set along the track so that the contact point said movable anvil structure carries will be made to abut any selected station contact point, a reference contact point on the fixed anvil structure facing one end of the station carrying member, means for releasably maintaining the movable anvil structure to the track means, spring means on the frame, biasing the station-carrying member towards said reference contact point on the fixed anvil structure, a table on the frame for supporting gage blocks between said reference contact point and said end of the station carrying member and contact elements on the anvil structures to be contacted by the anvils of gages to be set or checked.

2. An apparatus as defined in claim 1, wherein all the station contact points point in the same direction along the station carrying member.

3. An apparatus as defined in claim 1, wherein all the station contact points and the said reference contact point, all point in the same direction.

4. An apparatus as defined in claim 1, wherein all the station contact points are in at least one row along said station-carrying member.

5. An apparatus as defined in claim 1, wherein the contact elements on the anvil structures to be contacted by the anvils of gages, consist of one such contact element on each of the anvil structures, on the faces of such structures which are directly opposite each other.

6. An apparatus as defined in claim 1, wherein the contact elements on the anvil structures to be contacted by the anvils of gages, consist of one such contact element on each of the anvil structures, on the faces of such structures which are remotely opposite each other.

7. An apparatus as defined in claim 1, wherein the contact elements on the anvil structures to be contacted by the anvils of gages, consist of one such contact element on each of the anvil structures, on the faces of such structures which are directly opposite each other and one such contact element on the faces of said structures which are remotely opposite.

8. An apparatus as defined in claim 1, including one platform on each of said anvil structures respectively, to rest a gage on; said platforms being coplanar and including a slide slidably mounted on the frame for movement along a line perpendicular to the plane of said platforms; said slide having an element extending therefrom towards said plane in the region of the platform on the fixed anvil structure, means to shift said slide, means to releasably hold said slide at any set position on the frame and means including an indicator gage associated with said slide for showing the distance between the free end of said element which extends from the slide, to the plane of said platforms.

9. An apparatus as defined in claim 1, and including one platform on each of said anvil structures respectively, to rest a gage on; said platforms being coplanar and including a slide slidably mounted on the frame for movement along a line perpendicular to the plane of said platforms; said slide having an element extending therefrom towards said plane in the region of the platform on the fixed anvil structure, means to shift said slide, means to releasably hold said slide at any set position on the frame and means including an indicator gage associated with said slide for showing the distance between the free end of said element which extends from the slide, to the plane of said platforms.

10. An apparatus as defined in claim 1, wherein the distance between successive station contact points along the station-carrying member is an exact single standard unit of length.

11. An apparatus as defined in claim 10, wherein the contact elements on the anvil structures to be contacted by anvils of gages, consist of one such contact element on each of the anvil structures, on the faces of such structures which are directly opposite each other and one such contact element on the faces of said structures which are remotely opposite; the sum of the distances between said contact elements on each anvil structure respectively, being an exact whole number of said standard units of length.

12. An apparatus as defined in claim 1, wherein the relative movement between the movable anvil structure and the station-carrying member is attained by having said station-carrying member rotatable about a line longitudinally thereof and including cooperative means on the said station-carrying member and the frame to releasably hold said station carrying member against rotation.

13. An apparatus as defined in claim 12, wherein the station contact points are in a plurality of rows along the station-carrying member and the mentioned cooperating means is adapted to hold the station-carrying member fixed against rotation at predetermined positions about its axis of rotation whereat the contact point on the movable anvil structure can be made to abut station contact points one at a time in any row.

14. An apparatus as defined in claim 13, wherein successive station contact points along the station-carrying member are equi-spaced.

15. An apparatus as defined in claim 14, wherein the number of rows is two.

16. An apparatus as defined in claim 1, wherein the relative movement between the movable anvil structure and the station-carrying member is attained by having said movable anvil structure swingable about its track as an axis, to be clear for movement along the track to any station contact point and for contact therewith by the contact point on said movable anvil structure.

17. An apparatus as defined in claim 1, wherein all the station contact points point in the same direction along the station carrying member and wherein the means to releasably maintain the movable anvil structure along the track comprises a collar slidably mounted on the track; said track being a rod, means to releasably secure said collar to said track rod and a spring between and in contact with said collar and said movable anvil structure; said spring when stressed by movement of said collar along the track when said movable anvil is held in abutment with one of the station contact points, urging said movable anvil structure in the direction against such station contact point.

18. An apparatus as defined in claim 17, wherein all station contact points and the mentioned reference contact point on the fixed anvil structure, are in the same direction.

19. An apparatus as defined in claim 17, wherein the means to releasably secure said collar to the track rod, comprises a set screw positioned through a slot which is in the movable anvil structure in the direction of movement of said movable anvil structure; said set screw being threadedly engaged through a hole in said collar and adapted to engage said track rod; said slot being of a predetermined length so that when said set screw is moved laterally to a certain end of said slot to stress said spring associated with said collar, the extent of stress of such spring is limited.

20. An apparatus as defined in claim 17, wherein the movable anvil structure is U-shaped and the track is through at least one of the arms of said U-shape; said collar being between the arms of said U-shape.

References Cited in the file of this patent
UNITED STATES PATENTS 2,059,740     Minchew     Nov. 3, 1936